United States Patent [19]
Ferte et al.

[11] Patent Number: 5,240,167
[45] Date of Patent: Aug. 31, 1993

[54] FRICTION WELDING METHOD WITH INDUCTION HEAT TREATING

[75] Inventors: Jean-Pierre Ferte, Corbeil Essonnes; Francois Pierquin, Mennecy, both of France

[73] Assignee: Societe Nationale d'Etude et de Construction de Motors d'Aviation (S.N.E.CM.A.), Paris, France

[21] Appl. No.: 663,022

[22] Filed: Mar. 1, 1991

[30] Foreign Application Priority Data
Mar. 2, 1990 [FR] France .................. 90 02618

[51] Int. Cl.$^5$ .................. B23K 20/12; B23K 28/02
[52] U.S. Cl. .................. 228/114.5; 219/9.5; 228/231
[58] Field of Search .................. 228/112, 114, 228, 231; 219/8.5, 9.5, 10.491

[56] References Cited

U.S. PATENT DOCUMENTS

| | | | |
|---|---|---|---|
| 2,676,233 | 4/1954 | Foxx | 219/8.5 X |
| 2,919,335 | 12/1959 | Shaughnessy | 219/9.5 |
| 3,735,910 | 5/1973 | Watson et al. | 228/112 X |
| 4,698,473 | 10/1987 | Allini et al. | 219/10.491 X |
| 4,717,801 | 1/1988 | Brolin et al. | 219/9.5 |

FOREIGN PATENT DOCUMENTS

| | | |
|---|---|---|
| 1177756 | 9/1964 | Fed. Rep. of Germany . |
| 2107474 | 5/1972 | France . |
| 2299940 | 9/1976 | France . |
| 2641222 | 7/1990 | France . |
| 0493616 | 1/1974 | Japan .................. 228/112 |
| 982337 | 2/1965 | United Kingdom . |

OTHER PUBLICATIONS

French Search Report Nov. 30, 1990.

*Primary Examiner*—Kenneth J. Ramsey
*Attorney, Agent, or Firm*—Bacon & Thomas

[57] ABSTRACT

A method and an apparatus for friction welding two elements together are disclosed in which the areas of the two elements to be welded are heated by an induction heater. The induction heater may be used to heat the areas to be welded prior to contact between the elements, during such contact, and after the friction welding has been achieved in order to provide a heat treatment of the welded zone. The induction heater is generally annular in shape and may be dimensioned so as to be located around the elements at the welding zone, or to be placed between the surfaces of the elements to be welded together.

2 Claims, 1 Drawing Sheet

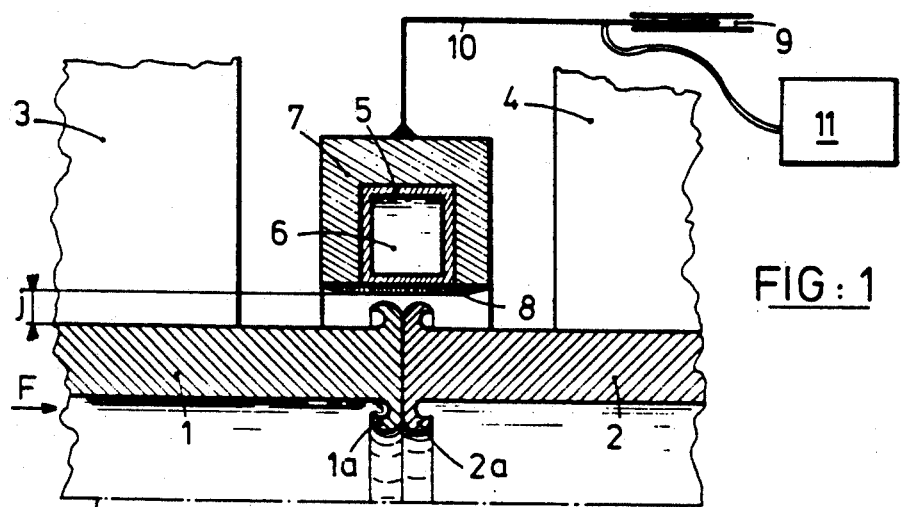
FIG:1
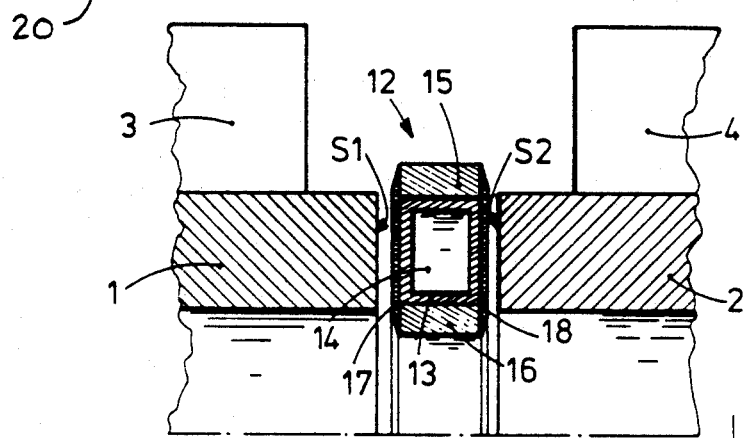
FIG:2
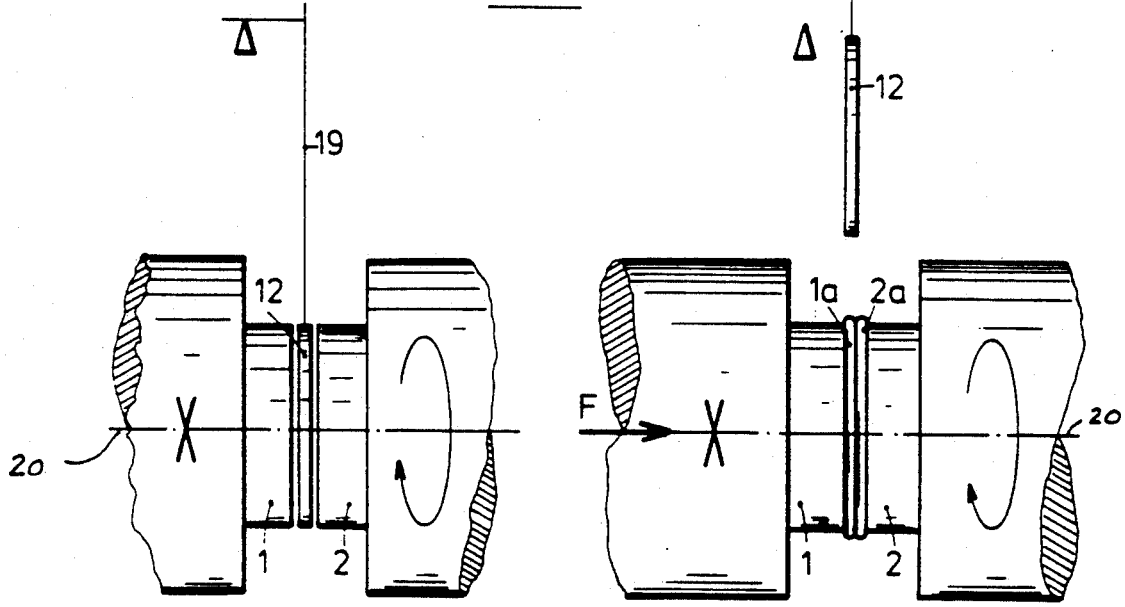
FIG:3  FIG:4

FRICTION WELDING METHOD WITH INDUCTION HEAT TREATING

BACKGROUND OF THE INVENTION

The present invention relates a friction welding method and an apparatus for carrying out this method.

Methods and apparatus for attaching two elements together by friction welding are well-known in the art and a typical example is illustrated in French Patent 2,641,222. This particular example describes a method for fabricating welded parts having an accurate and reproducible final length.

Pressure-welding procedures involving inter-metal diffusion and transition into the super-plastic state are known and a typical example is disclosed in French Patent 2,299,940. In this disclosure, the welding zone of the metal parts being welded together is subjected to an alternating, and repeating heating and cooling cycle.

While the known friction-welding techniques have been generally successful, many quality problems remain, in particular when such techniques are used in making aeronautical engine parts of precipitation-hardened nickel superalloys. Unacceptable mechanical characteristics have been observed in some of these parts due to the crack propagation properties caused by certain metallurgical changes in the welded zones after insufficiently controlled inertial friction welding, particularly where thermal cycling has taken place in the welding zones.

SUMMARY OF THE INVENTION

A method and an apparatus for friction welding two elements together are disclosed in which the areas of the two elements to be welded are heated by an induction heater. The induction heater may be used to heat the areas to be welded prior to contact between the elements, during such contact, and after the friction welding has been achieved in order to provide a heat treatment of the welded zone.

The induction heater according to this invention is generally annular in shape and may be dimensioned so as to be located around the elements at the welding zone, or to be placed between the surfaces of the elements to be welded together in order to heat the surfaces prior to contact between the elements.

BRIEF DESCRIPTION OF THE DRAWINGS

FIG. 1 is a partial, longitudinal, cross-sectional view of a first embodiment of the friction welding apparatus according to the present invention.

FIG. 2 is a partial, longitudinal, cross-sectional view of a second embodiment of the friction welding apparatus according to the present invention.

FIGS. 3 and 4 are partial, schematic illustrations showing the use of the induction heater of the second embodiment of the present invention.

DETAILED DESCRIPTION OF THE PREFERRED EMBODIMENT

As illustrated in FIG. 1, the friction welding techniques utilized to weld elements 1 and 2 to each other involve placing the elements in jaws or chunks 3 and 4, respectively. It is understood that elements 1 and 2 are generally annular in configuration and have a central axis 20. The elements may be of any shape having an axis of revolution, but the invention has been found to be particularly applicable to the fabrication of aircraft engine parts, such as shafts or rotors made of nickel-based superalloy material. One of the elements, in this particular instance element 2, is held stationary by stationary jaws or chuck 4, while the other element, element 1, is rotated about axis 20. The jaw or chuck 3 is, by known means, attached to a flywheel by a clutch mechanism. Upon reaching sufficient rotational speed, element 1 is moved toward element 2 such that their facing surfaces S1 and S2 come into contact with each other. Contact is maintained by a compression force F between the surfaces S1 and S2 while rotation of the flywheel continues the rotation of element 1 thereby generating frictional heat. Element 1 continues to rotate as the stored kinetic energy of the flywheel is dissipated causing the formation of beads 1a and 2a. When element 1 ceases to rotate, the surfaces S1 and S2 have been deformed on either side of the welding plane and the friction welding process (inertial friction welding) is completed.

In another friction welding method, generally designated controlled-friction welding, two consecutive steps are necessary. In the first step, element 1 is rotated at a constant speed by connection to a motor and is brought into contact with the stationary element 2 at moderate axial pressure thereby generating progressive friction heating. Once the friction heating has reached an adequate level, additional axial force is applied for a predetermined time thereby forming the beads 1a and 2a due to the deformation caused by this axial force to achieve the friction welding.

In addition to these known friction-welding techniques, the present invention incorporates an induction heater to provide additional heat to the welding zones of the elements to be welded. In a first embodiment, as illustrated in FIG. 1, the induction heater comprises an inductor with a single turn 5 which defines a cavity 6 adapted to receive water to cool the inductor. The inductor 5 is generally annular in configuration and defines a plurality of surfaces. The surface facing the welding zone between the elements 1 and 2 is coated by an electrically and thermally insulating layer 8, while a magnetic yoke 7 covers the remaining surfaces. The inductor 5 may be formed in several segments so that it may easily be placed around the elements 1 and 2. Known means may be provided to attach the segments of the inductor together such that, in use, it forms a generally annular configuration.

The inductor is attached to a slide means 9, schematically illustrated in FIG. 1, which allows the position of the inductor to be adjusted so that it lies across the welding plane. A sufficient radial clearance j is provided between the inner diameter of the inductor and the elements 1 and 2 such that the beads 1a and 2a can form without coming into contact with the inductor. Power to the inductor is supplied by connectors 10, which are also connected to regulator 11, illustrated schematically in FIG. 1. The regulator 11 controls the power from the current generator to the inductor so as to control the thermal cycle of the welded zone. The additional heat transfer provided by the inductor may be supplied prior to the initiation of contact between the elements 1 and 2; may be supplied throughout the friction-welding cycle; or may be provided subsequent to the completion of the friction welding cycle to provide a heat treatment of the welded zone.

The control of the thermal cycle in the welding zone, which is determined by the control of the additional heat supplied by the inductor, substantially improves the results of the friction welding process. When used on precipitation-hardened superalloy elements, especially nickel-based aeronautical engine parts, the microstructures achieved by the known friction welding techniques were often unsatisfactory. The alloy's hardening phases were noted as being dissolved because of the short, intense and localized heating of the welding zones caused by the friction welding process, which was followed by fine precipitation during the cooling period. The microstructures thus obtained resulted in inadequate and degraded mechanical properties, such as fatigue crack propagation or creep, compared to the base material unaffected by the friction welding.

The induction heater according to the present invention may be used to regenerate, in part or substantially totally, the base metal microstructure in the welding zone in order to increase the mechanical properties, such as the resistance to hot crack propagation of a nickel-based superalloy with a high proportion of hardening phase. This is achieved by turning on the induction heater at the end of the friction welding process. Instead of letting the welded area cool naturally from its temperature of approximately 1,250°–1,300° C., the induction heater is turned on to keep the welded area at a temperature of between 1,100° and 1,150° C. for a time between 15 and 60 minutes. At the end of this time, the temperature of the welded area is lowered at cooling rates of between 100°–200° C./min. between 1,100° and 700° C. The maintenance of the temperature of the welded area at a level of 1,100°–1,150° C. allows the regeneration of a population of hardening precipitates at the grain joints of the welded zone. The controlled cooling allows the development of intergranular precipitation hardening corresponding to that of the base metal.

By using this method, the hot-crack (600°–700° C.) propagation resistance (which for conventional friction welding is only a small fraction of the base metal, approximately 1.5%) is restored to substantially the level of the base metal.

Excessively rapid cooling of the welded zone also introduces residual stresses in the form of undesirable tensions. These drawbacks are also eliminated by the use of the induction heater to maintain the temperature and to provide a controlled cooling of the friction welded zone.

In addition to the significant advantages of producing parts of increased quality, the invention also provides other notable advantages. The use of the induction heater to supply additional heat represents an industrially significant and more economical way to increase the capacity of the welding apparatus. In the case of inertial-friction welding, the necessary mass of the inertial weight may be reduced since the temperature of the welded zone may be raised by the induction heater. In controlled friction welding, the power of the drive motor may also be reduced by the use of the induction heater pre-heating the parts to be welded.

By using the induction heater in conjunction with given equipment power, the capacity of the given equipment may be increased. Specifically, known inertial-friction welding equipment with a kinetic energy limited to $3 \times 10^5$ Joules cannot weld nickel superalloy precipitation hardened parts in which the welding area exceeds $4 \times 10^3$ mm². Preheating the parts immediately before placing them in contact with each other in the manner illustrated in FIG. 1, at a temperature between 600° and 800° C. for 1–5 minutes and using the conventional welding allows parts having welding areas up to $5 \times 10^3$ mm² to be welded by the known equipment. Quite obviously, this results in a significant increase in the capacity of the given equipment.

Depending upon the particular applications or the kind of friction-welding equipment being used, the invention may assume a number of variations. A second embodiment of the invention is illustrated in FIGS. 2–4. In these figures, elements having the same or similar function as those in FIG. 1 are denoted by these same references numerals. As can be seen, elements 1 and 2 are to be welded together and, as in the previously described embodiment, are clamped in jaws or chucks 3 and 4, respectively. The elements are oriented such that the surfaces S1 and S2 to be welded together face each other and are spaced apart. An annular induction heater 12 is placed between the two opposing surfaces S1 and S2. The induction heater 12 comprises a single turn induction circuit 13 which defines an inner cavity 14 to enable the induction circuit 13 to be water cooled. The inductor 12 defines a plurality of surfaces and the surfaces of the inductor facing surfaces $S_1$ and $S_2$ of elements 1 and 2 are coated with electrically and thermally insulating materials 17 and 18, respectively. The remaining surfaces of the inductor 12 are covered by an external magnetic yoke 15 and an internal magnetic yoke 16.

The welding operation utilizing this embodiment is illustrated in FIGS. 3 and 4. Element 1 is kept stationary while element 2 is rotated about axis 20 while the elements are displaced apart on either side of the induction heater 12. The induction heater 12 supplies heat to the end portions of the elements 1 and 2 which are to be welded and this heat is maintained until the desired preheating temperature of the welding zones is achieved. At this point, the induction heat is turned off and the induction heater 12 is rapidly withdrawn by means of its connection to the support arm 19, as illustrated in FIG. 4. Upon withdrawal of the induction heater 12, the elements 1 and 2 are moved into contact with each other and a compression force F is applied until the rotating part has ceased its rotation. The formation of the welding beads 1a and 2a is achieved and the welding process is completed.

The induction heater 12 may be provided with a known regulator to control the heating cycle. The heating cycle should take into account the temperature of the welding zone and will control the heating source connected to the induction heater.

The foregoing description is provided for illustrative purposes only and should not be construed as in any way limiting this invention, the scope of which being defined solely by the appended claims.

We claim:

1. In a method of friction welding two elements of precipitation-hardened nickel-based super alloy together having the steps of:
   orienting the elements such that surfaces to be friction welded face each other; holding one of the elements stationary; rotating the other of the elements; and bringing the elements into contact with each other such that the contacting surfaces are welded together, the improvement comprising the step of providing means to heat the elements in the areas adjacent to the surfaces to be welded, and the additional step of heating the elements in areas adjacent to the welded surfaces after the friction welding is completed to a temperature between 1,100° and 1,500° C. for between 15 and 60 minutes.

2. The method of claim 1 comprising the additional step of reducing the heat supplied to the welded areas by reducing the temperature at a rate of between 100° to 200° C./min between 1,100° and 700° C.

* * * * *